(12) United States Patent
Berghash et al.

(10) Patent No.: US 9,211,896 B1
(45) Date of Patent: Dec. 15, 2015

(54) SCOOTER WITH OUTRIGGER (71) Applicant: Shield Mfg., Inc., Tonawanda, NY (US)

(72) Inventors: Robert Berghash, Bluffton, SC (US);
Amy Hangen, Clarence, NY (US);
David Delisanti, Sanborn, NY (US)

(73) Assignee: Shield Mfg., Inc., Tonawanda, NY (US)

( * ) Notice: Subject to any disclaimer, the term of this patent is extended or adjusted under 35 U.S.C. 154(b) by 0 days.

(21) Appl. No.: 14/138,350

(22) Filed: Dec. 23, 2013

(51) Int. Cl.
*B62B 3/02* (2006.01)

(52) U.S. Cl.
CPC ........................................ *B62B 3/02* (2013.01)

(58) Field of Classification Search
CPC ........... A63C 17/0033; A63C 2203/06; A63C 2203/40; A63C 17/04; A63C 2203/42; A63C 5/031; A63C 2201/12; B62B 3/02; B62B 13/005; B62B 3/007; B62B 3/04; B60D 1/00; B60D 1/481; B60D 2001/005; B60D 1/143; B60D 1/44; B60D 1/54; B25H 5/00; A63B 22/20; A63B 2210/50; B60R 7/043; B62D 63/061; B62D 63/062
USPC ............... 280/87.05, 87.2, 87.01, 87.021, 18, 280/18.1, 21.1, 47.2, 638, 35, 38, 39, 79.11, 280/79.2, 79.5, 32.6, 15, 656; 24/297, 458; 411/508, 913
See application file for complete search history.

(56) References Cited

U.S. PATENT DOCUMENTS

| | | | | |
|---|---|---|---|---|
| 1,668,379 A * | 5/1928 | Radvanyi | ...................... | 280/32.6 |
| 2,219,905 A * | 10/1940 | Prickman | ...................... | 280/18.1 |
| 2,448,427 A * | 8/1948 | Gordon | ...................... | 280/32.5 |
| 2,472,952 A * | 6/1949 | Lennard | ...................... | 280/35 |
| 3,116,935 A * | 1/1964 | Mitchin et al. | ................. | 280/7.1 |
| 3,134,607 A * | 5/1964 | Doll | ...................... | 280/141 |
| 3,145,029 A * | 8/1964 | Ollanketo | ...................... | 280/16 |
| 3,374,000 A * | 3/1968 | Wetzel | ...................... | 280/8 |
| 3,508,762 A * | 4/1970 | Pratt | ...................... | 280/81.1 |
| 3,633,774 A * | 1/1972 | Lee | ...................... | 414/809 |
| 3,663,038 A * | 5/1972 | Hendricks | ...................... | 280/218 |
| 3,677,569 A * | 7/1972 | Larson | ...................... | 280/32.6 |
| 3,771,811 A * | 11/1973 | Bueno | ...................... | 280/87.042 |
| 4,166,630 A * | 9/1979 | Sullivan et al. | .......... | 280/87.021 |
| D266,100 S * | 9/1982 | Miller | ...................... | D21/426 |
| 4,647,056 A * | 3/1987 | Baker | ...................... | 280/37 |
| 4,744,576 A * | 5/1988 | Scollan, Jr. | .............. | 280/87.042 |
| D296,048 S * | 6/1988 | Eie | ................... | D6/355 |
| 4,761,013 A * | 8/1988 | Dowton | ................... | 280/87.021 |
| 5,052,703 A * | 10/1991 | Bertrand | ................... | 280/47.34 |
| 5,106,109 A * | 4/1992 | Tattersall et al. | ................. | 280/9 |
| 5,110,147 A * | 5/1992 | Gershman | ................... | 280/79.5 |
| 5,318,312 A * | 6/1994 | Montemayor | ................... | 280/30 |
| D356,412 S * | 3/1995 | Hensley, Jr. | ................... | D34/23 |
| 5,395,154 A * | 3/1995 | Wang | ........................... | 297/130 |
| 5,524,915 A * | 6/1996 | Liu | ................... | 280/30 |
| 5,957,482 A * | 9/1999 | Shorter | ................... | 280/639 |
| 6,079,941 A * | 6/2000 | Lee | ................... | 414/812 |
| 6,270,091 B1 * | 8/2001 | Smith | ........................ | 280/14.21 |
| 6,457,731 B1 * | 10/2002 | Paranto et al. | ............... | 280/249 |

(Continued)

*Primary Examiner* — Paul N Dickson
*Assistant Examiner* — Bridget Avery
(74) *Attorney, Agent, or Firm* — Simpson & Simpson, PLLC (57) ABSTRACT

A scooter with casters or similar devices enabling it to move smoothly with efficient change of direction. Also included is an outrigger with crosspieces that provide footrests for the rider. The crosspieces are shaped to enable two scooters to be attached in an assembly. The crosspiece is stored in locked and/or nested fashion in a storage cavity formed into the bottom surface of the scooter. A safety belt and backrest may be used with the scooter.

18 Claims, 9 Drawing Sheets

(56) References Cited

U.S. PATENT DOCUMENTS

| | | | |
|---|---|---|---|
| 6,561,530 B2 * | 5/2003 | Carbonero | 280/87.041 |
| 6,805,367 B1 * | 10/2004 | Heller | 280/87.01 |
| 6,834,867 B2 * | 12/2004 | Smith | 280/14.21 |
| 6,874,807 B1 * | 4/2005 | Labadie et al. | 280/656 |
| 6,974,140 B2 * | 12/2005 | Neuman | 280/79.11 |
| 7,100,927 B2 * | 9/2006 | Krent | 280/16 |
| 7,140,622 B1 * | 11/2006 | Cantu | 280/79.11 |
| 7,185,911 B1 * | 3/2007 | Leverett | 280/656 |
| 7,213,819 B2 | 5/2007 | Carbonero | |
| 7,350,799 B2 * | 4/2008 | Labadie et al. | 280/656 |
| 7,360,784 B2 * | 4/2008 | Stewart et al. | 280/656 |
| 8,006,984 B2 * | 8/2011 | Chubb | 280/33.998 |
| 8,215,662 B2 * | 7/2012 | Koehler et al. | 280/656 |
| 8,936,253 B1 * | 1/2015 | Rizzi | 280/20 |
| 2002/0140200 A1 * | 10/2002 | Paranto et al. | 280/242.1 |
| 2011/0133417 A1 * | 6/2011 | Rouillard et al. | 280/35 |

* cited by examiner

SCOOTER WITH OUTRIGGER

FIELD OF THE INVENTION

The present invention pertains to the field of equipment used in play or physical education settings, particularly to equipment suitable for children that are physically disadvantage, and more particularly to equipment suitable for a blended play or classroom setting.

BACKGROUND OF THE INVENTION

In order to provide as typical an environment as possible, the current trend in education is to mix physically and mentally disadvantaged children with physically uninhibited children into a "blended" setting whenever possible. Creating a blended setting also helps school administrations teach children to work with disadvantaged youths as well as to reduce costs by removing some of the need for specialized teachers and classrooms.

This trend toward blended education settings extends as much as possible into physical education classrooms. In physical education, the challenge to provide a meaningful experience simultaneously for both disadvantaged and physically uninhibited students is especially daunting. With physically uninhibited children there is a range of physical ability, with some students being faster and/or stronger than others. However, in a blended physical education setting, two distinct groups of students are formed, namely physically uninhibited students and disadvantaged students. This situation makes it difficult to create a class or activity in which both groups of students have a shared exercise that provides an educational experience and equal pleasure to both groups.

Therefore, there is a need in the field for a device that will enable the efficient blending of disadvantaged and normal children in a physical education or play environment.

SUMMARY OF THE INVENTION

The present invention broadly comprises a scooter comprising: a seat having a top surface, a bottom surface, a front side, at least two lateral sides, and a rear side, the at least two lateral sides, the front side, and the rear side forming an outer perimeter of the seat; a lip projecting from the top surface and extending from the at least two lateral sides and the rear side; a pair of handholds wherein each one of the pair of handholds is on one of the at least two lateral sides; a plurality of rolling means attached to the bottom surface; and, an outrigger having a first end and a second end and nestingly stored in the bottom surface.

In an alternate embodiment, the present invention also broadly comprises an assembly of a plurality of scooters, each of the scooters comprising: a seat having a top surface, a bottom surface, at least two lateral sides, a front side, and a rear side, the at least two lateral sides, the front side, and the rear side forming an outer perimeter of the seat; a lip projecting from the top surface and extending to each of the opposing sides and a the rear side; a pair of handholds wherein each one of the pair of handholds is on one of the at least two lateral sides; a plurality of rolling means attached to the bottom surface; and, an outrigger having a first end and a second end and nestingly stored in the bottom surface; wherein each of the plurality of scooters is releasably connected to at least one other scooter of the plurality of scooters by the outrigger.

An object of the invention is to provide a device that can be used in a blended play or physical education environment.

A second object of the invention is to present a device that can be used singly or in an assembly of devices.

A third object of the invention is to supply a recreational device that provides safety equipment for a user.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
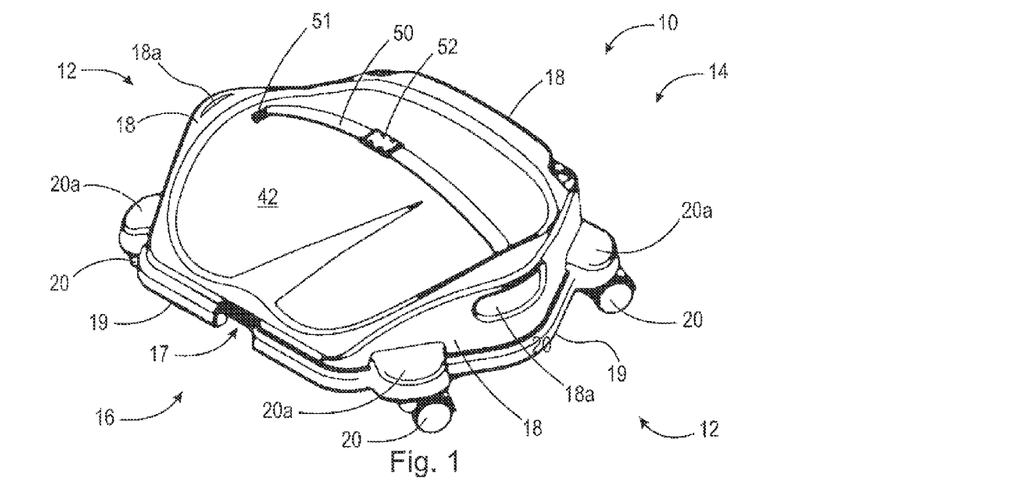
FIG. 1 is a top perspective view of the scooter of the present invention.

Adverting to the drawings, FIG. 1 is a top perspective view of scooter 10 of the present invention. The body of scooter 10 includes a top surface in the form of seat 42 provides a surface for a user to sit on scooter 10. Scooter 10 includes at least two lateral sides 12, rear side 14, and front side 16. Lateral sides 12, rear side 14, and front side 16 form outer perimeter 19. Lip 18 projects up generally perpendicularly from top surface 42 of the outer portion of seat 42 and extends around scooter 10 from the at least two lateral sides 12 and rear side 14. Seat belt 50 protrudes through slit 51 and extends across seat 42 with the two ends releasably held together by buckle 52. Gap 17 is seen in perimeter 19 on front side 16. A lateral side is defined as a side that does not face directly toward the front or rear.

FIG. 1 also depicts rolling means 20 attached to scooter 10. In a preferred embodiment, covers 20a project from perimeter 19 to cover rolling means 20 and act as the attachment point of rolling means 20 to scooter 10. Alternatively, rolling means 20 may be attached directly to the bottom surface of scooter 10. Rolling means 20 may be wheels, rollers, casters, or other similar devices well known to those having skill in the art. Preferably, rolling means 20 are casters 20 that are swivelingly attached to covers 20a to support scooter 10 off the floor or ground and to allow smooth movement and change of direction for scooter 10. Handholds 18a are spaces defined, i.e. surrounded by lip 18 and are preferably positioned on opposing lateral sides 12. In a preferred embodiment, seat 42 is contoured ergonomically for maximum comfort for the user.

Figure 2:
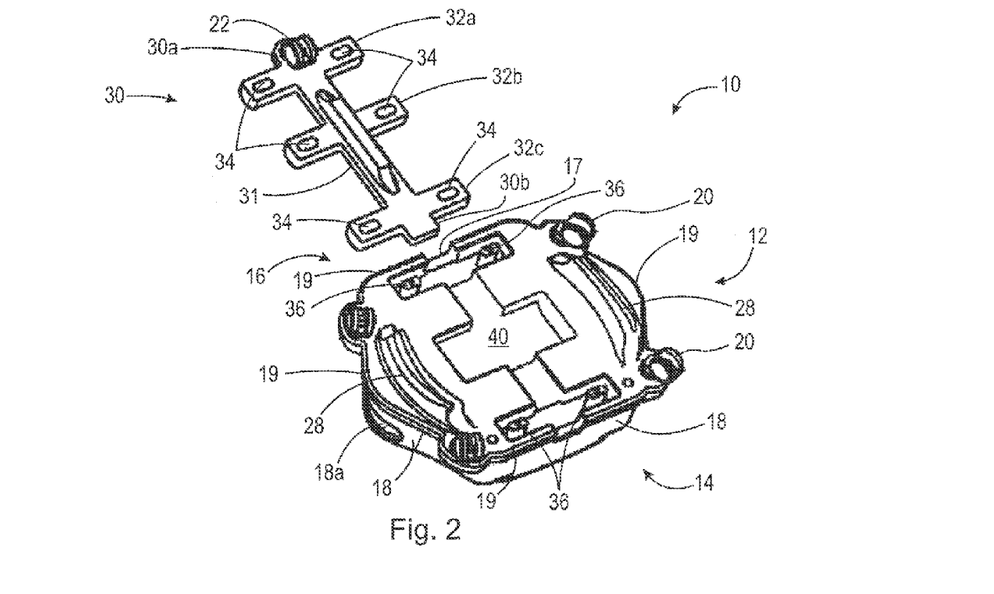
FIG. 2 is a bottom perspective exploded view of the scooter of the present invention showing the scooter and the outrigger with crosspieces extending from the long arm of the outrigger.

FIG. 2 is a bottom perspective view of scooter 10 also showing outrigger 30. Outrigger 30 includes forward end 30a and back end 30b as well as long arm 31 ("arm 31") with front crosspiece 32a, middle crosspiece 32b, and rear crosspiece 32c (collectively "crosspieces 32") extending from arm 31. In the preferred embodiment shown in FIG. 2, the three crosspieces 32 extend substantially perpendicularly from arm 31. By substantially in this context is meant that crosspieces 32 are visibly perceived as extending perpendicularly from arm 31. Preferably, crosspieces 32 are integral with arm 31 to form a single integrated unit. By integral is meant that the component parts are formed together as a single unit. Locking holes 34 are found at each end of crosspieces 32. Optionally, rolling means 22 is proximate front crosspiece 32a and may be a caster swivelingly attached to outrigger 30 or a wheel rotatingly attached to outrigger 30. Protrusions 28 are also seen protruding from the bottom surface of scooter 10.

Figure 3:
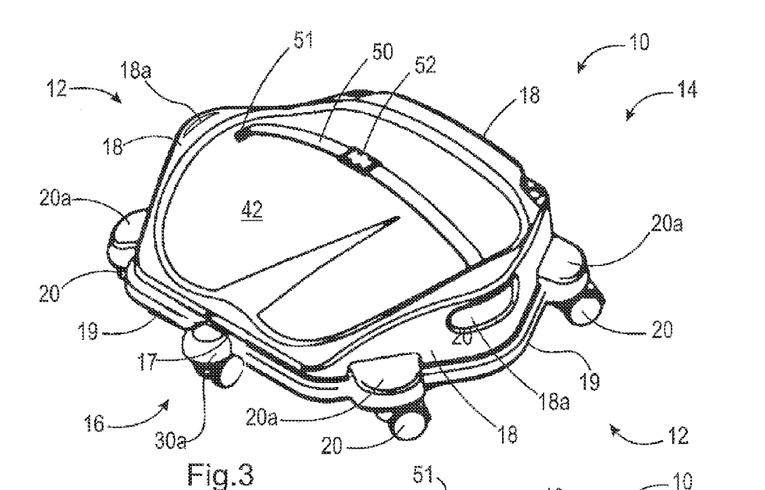
FIG. 3 is a top perspective view of the scooter of the present invention with the outrigger stored in the storage cavity.
Figure 4:
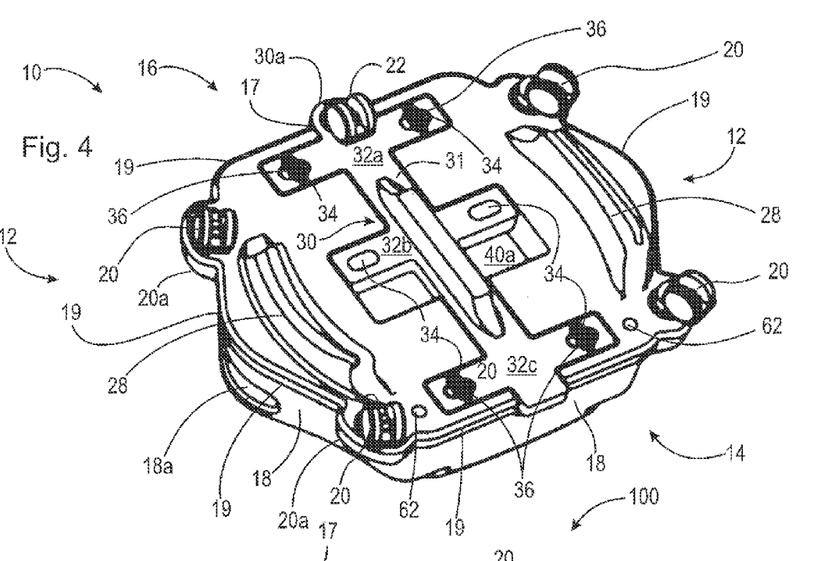
FIG. 4 is a bottom perspective view of the scooter with the outrigger stored in the storage cavity.

Outrigger 30 is preferably stored in nested fashion in storage cavity 40 formed in the bottom surface of scooter 10 as seen in FIG. 4. Locking means 36, positioned in the bottom of storage cavity 40, are received into locking holes 34 to hold outrigger 30 in storage cavity 40. In an alternate embodiment, outrigger 30 may be held in nested fashion in cavity 40 with a snug, friction fit without using locking means. FIG. 3 is a top perspective view of scooter 10 with outrigger 30 stored in cavity 40. Forward end 30a is seen extended through gap 17.

FIG. 4 is a bottom perspective view of scooter 10 with outrigger 30 stored in storage cavity 40. Locking means 36 extend through locking holes 34 to hold outrigger 30 in place in cavity 40. In the embodiment shown, it can be seen that middle area 40a of cavity 40 is larger than crosspiece 32b. As mentioned above, in an alternate embodiment, outrigger 30 can be stored in cavity 40 with a friction fit.

Figure 5:
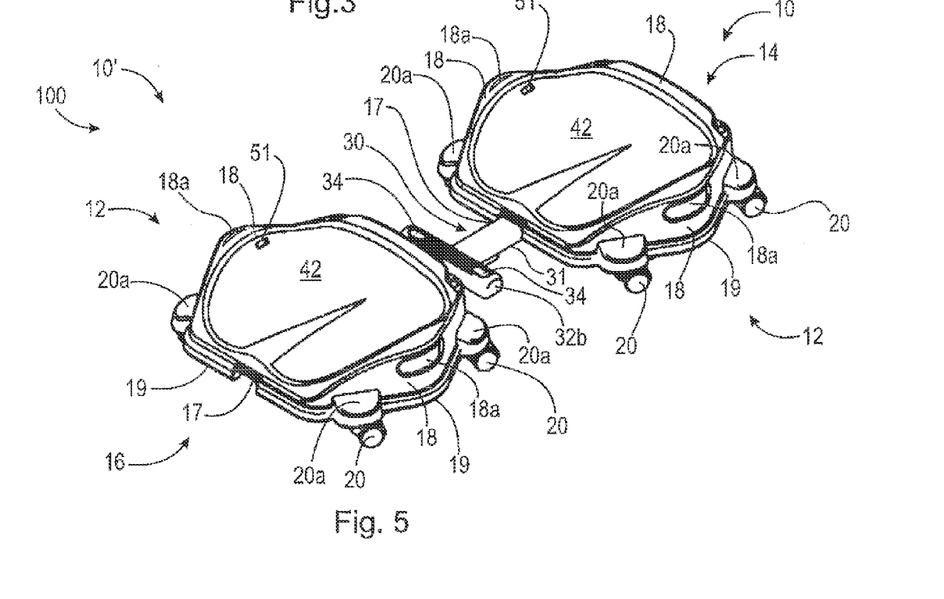
FIG. 5 is a top perspective view of an assembly of two scooters with one scooter attached at either end of an outrigger.
Figure 6:
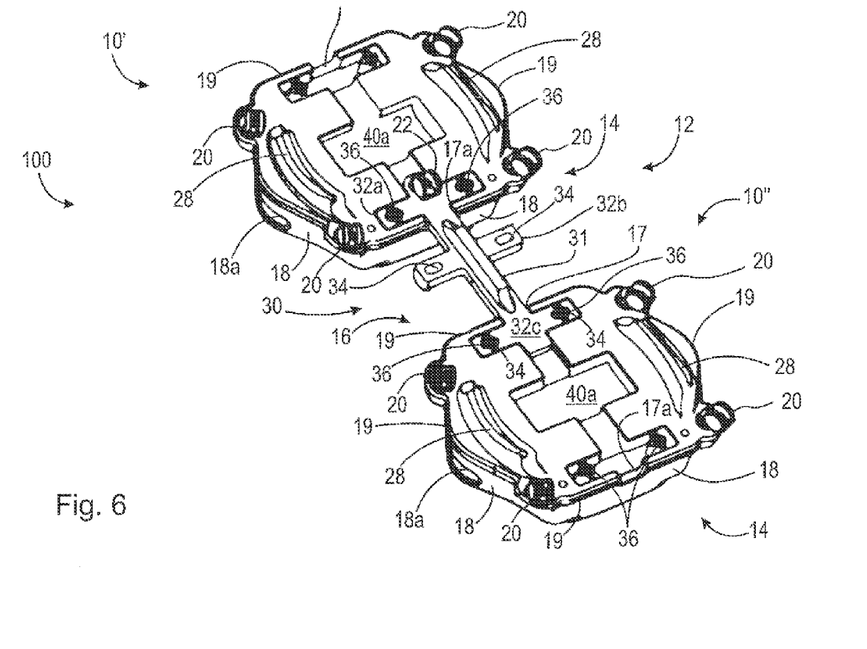
FIG. 6 is a bottom perspective view of the assembly showing the attachment of the outrigger to between two scooters in the assembly.

FIG. 5 is a top perspective view of assembly 100 of lead scooter 10' and rear scooter 10" with the two scooters attached at either end of outrigger 30 extending from rear scooter 10". FIG. 6 is a bottom perspective view of the assembly showing the attachment of outrigger 30 to scooters 10' and 10" of assembly 100. Outrigger 30 forms an attachment between rear side 14 of forward scooter 10' and lead side 16 of back scooter 10". Front cross piece 32a is locked into the rear cross cavity of storage cavity 40 in front scooter 10' using locking means 36 while rear crosspiece 32c is locked into the front cross cavity of storage cavity 40 of back scooter 10" using locking means 36. In the preferred embodiment shown, it can be seen that front crosspiece 32a and rear crosspiece 32c are preferably sized to fit securely within the front and rear portions of cavity 40. Front end 30a with cross piece 32a forms a linking end supported by rolling means 20, which may be caster 20. It will be recognized that assembly 100 may include more than two scooters 10 attached together as described above.

Figure 7:
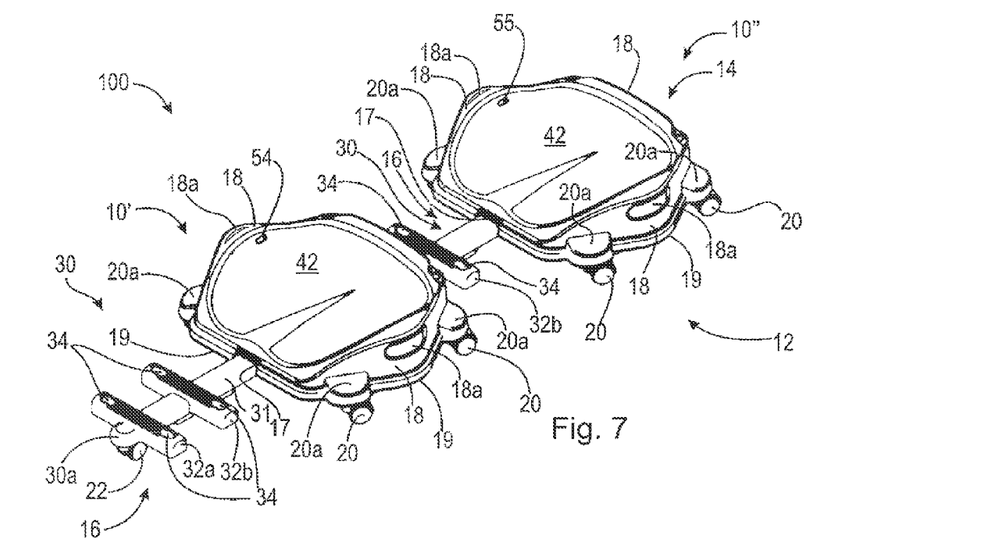
FIG. 7 depicts the scooter assembly in which one outrigger extends beyond the gap in the front end of the forward scooter with the front crosspiece and middle crosspiece both showing beyond front end of the lead scooter.

FIG. 7 depicts scooter assembly 100 in which one outrigger 30 extends beyond gap 17 so that front crosspiece 32a and middle crosspiece 32b are both showing beyond front end 16 of lead scooter 10'. Rolling means 22 supports the front end of outrigger 30 and allows it to move easily with scooters 10 and 10'.

Figure 8:
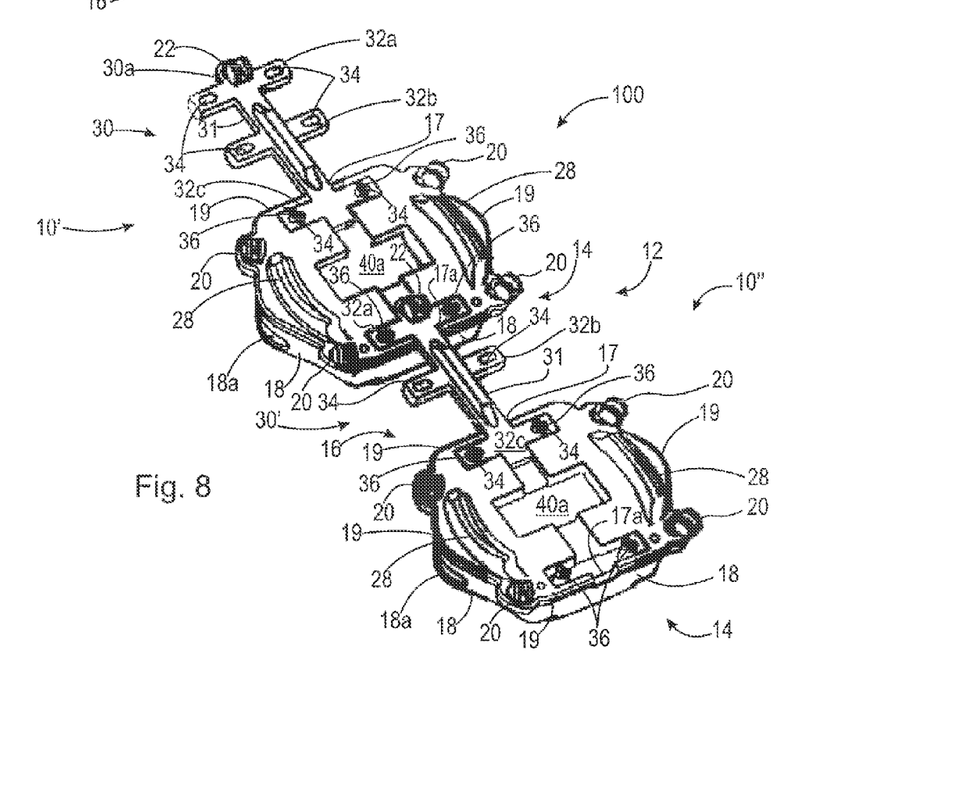
FIG. 8 is a bottom perspective of the assembly showing how the outriggers attach the individual scooters in a chain- or train-like assembly.

FIG. 8 is a bottom perspective of assembly 100 showing how the outriggers 30 attach individual scooters 10' and 10" in a chain- or train-like assembly as well as how the outrigger from lead scooter 10 enables movement of the entire assembly 100. Lead outrigger 30 is attached to lead scooter 30 by locking means 36 located in the forward cross cavity in storage cavity 40. This attachment provides back end support for outrigger 30 while rolling means 22 provide front end support as well as enabling lead scooter 10 to move supported by rolling means 20 attached to scooter 10 itself.

Rear scooter 10" is attached to lead scooter 10' by connecting the front end 30a of second outrigger 30' to the back gap 17a in lead scooter 10' again using locking means 36. Similar to lead outrigger 30, front end 30a of second outrigger 30' is supported on a floor or ground by rolling means 22. Preferably access to the back cross cavity is provided by gap 17a in rear end 14 of scooter 10.

Figure 9:
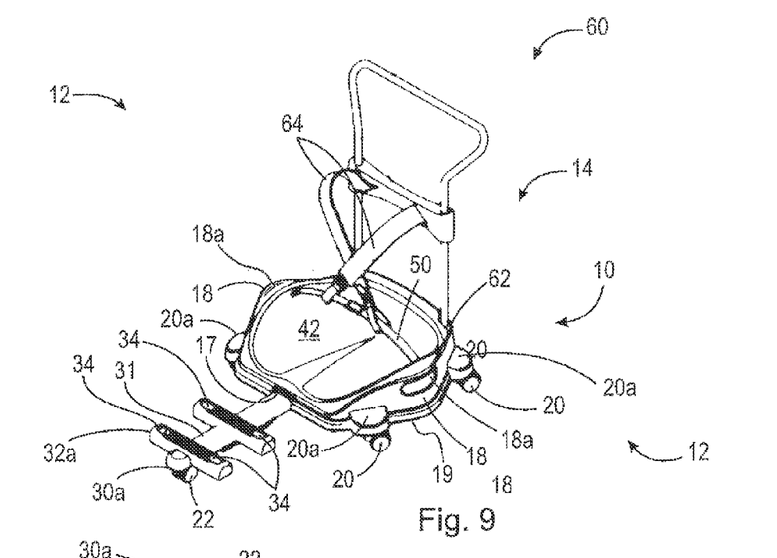
FIG. 9 is a top perspective view of an additional embodiment of the scooter of the present invention in which a back rest is joined to the scooter.

FIG. 9 is a top perspective view of scooter 10 depicting an additional embodiment in which back rest 60 is joined to scooter 10. In one embodiment, backrest 60 is inserted into support holes 62 proximate rear end 14 of scooter 10. This insertion may form a releasable connection. Alternatively, backrest 60 may be fixedly attached to scooter 10.

Shoulder straps 64 are attached to backrest 60 in a supporting manner and extend to safety straps 50 to hold a rider, such as a physically disadvantaged rider, in place while a second person pushes scooter 10 through backrest 60.

Figure 10:
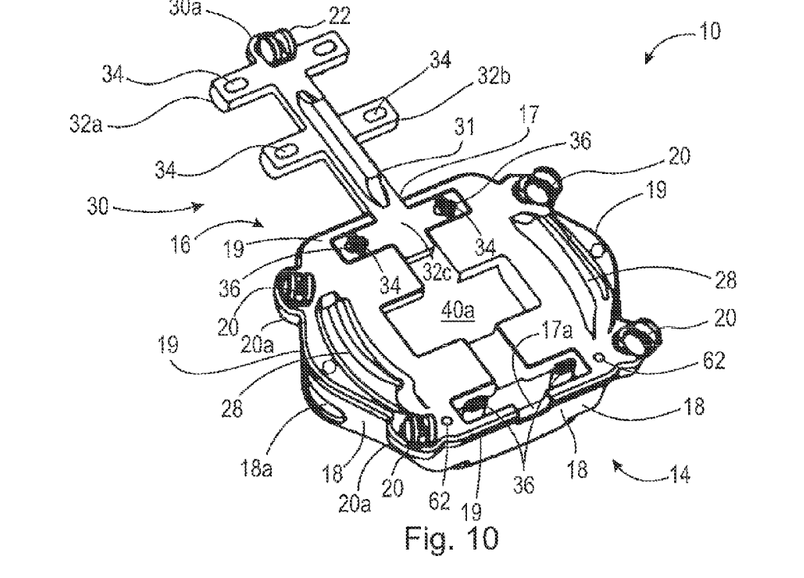
FIG. 10 is a bottom perspective view showing an outrigger extended from and attached to a single scooter.

FIG. 10 is a bottom view of scooter 10 showing outrigger 30 attached to scooter 10 and extending out of opening 17. Also seen are holes 62 which receive backrest 60 into scooter 10.

Figure 11:
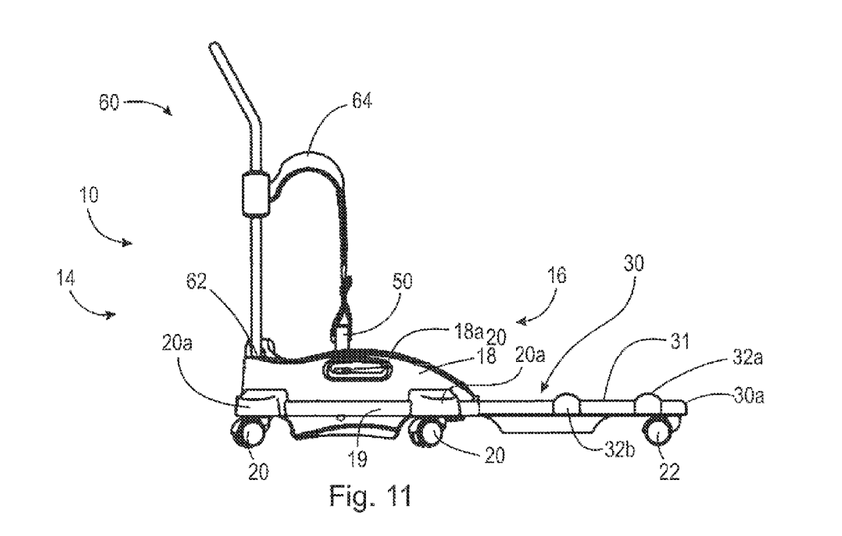
FIG. 11 is a side view of the scooter with the backrest attached.
Figure 12:
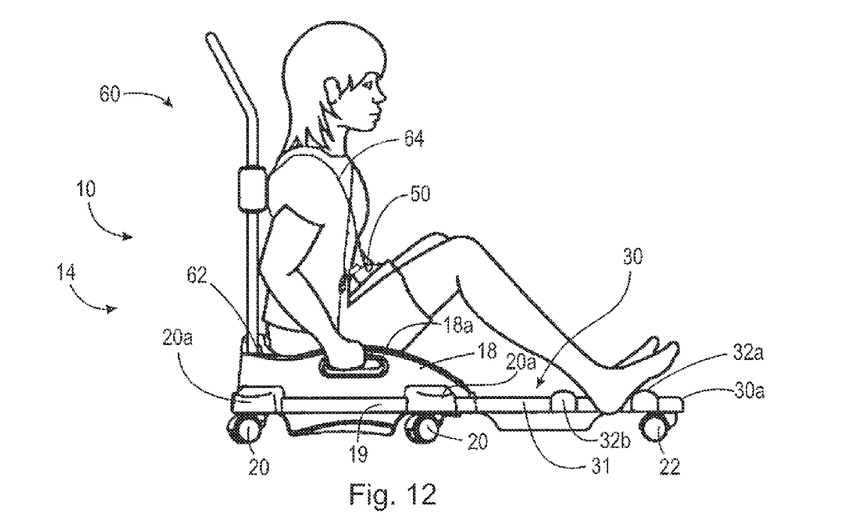
FIG. 12 is the same view as FIG. 10 also showing a rider sitting in the scooter.

FIG. 11 is a side view of scooter 10 with backrest 60 attached to scooter 10. Outrigger 30 extends from front end 16. Also seen are back strap 60 attached to safety strap 50. FIG. 12 is a similar side view with a rider sitting on the top surface of scooter 10 and held in place by safety strap 50 and back strap 60. Front cross piece 32*a* acts as a foot rest for the rider which has the advantage of providing support for the legs and feet of the rider while simultaneously enabling more efficient movement of scooter 10 as the rider's feet do not drag on the floor or ground or interfere with the movement of scooter 10. Middle cross piece 32*b* can be used as a foot rest for riders with shorter legs.

Figure 13:
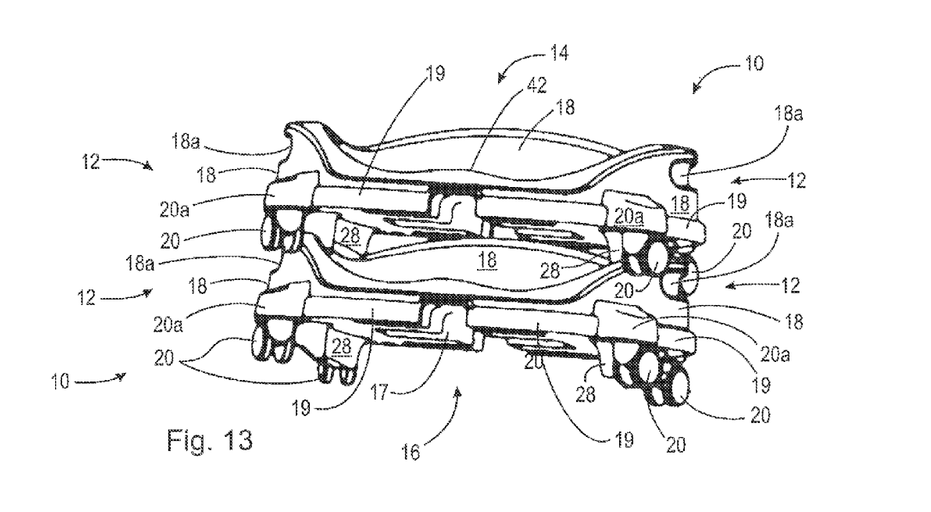
FIGS. 13 and 14 are front perspective views the scooters stacked securely on one another.
Figure 14:
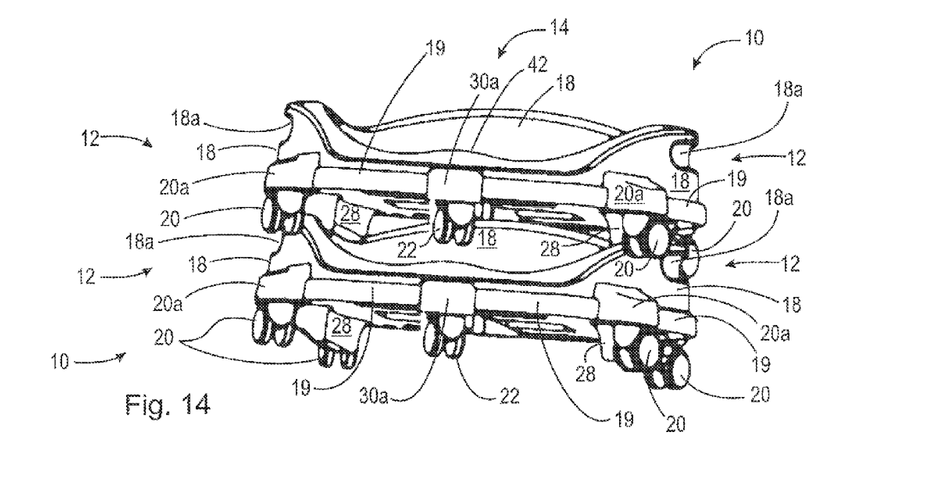

FIGS. 13 and 14 are front perspective views showing scooters 10 stacked securely on one another. By securely is meant that the scooters include a feature and/or shape that enables stacking while the tendency of the stack to fall is reduced or eliminated. Bottom protrusion 28 is positioned and shaped to fit partly around lip 18 of the scooter stacked below it. This provides the lateral support needed to reduce the possibilities of the stack falling. Persons of skill in the art will recognize that other features with different shapes may also be used to add to the stability of the stack. FIG. 13 depicts scooters 10 stacked without outriggers 30, while FIG. 14 show outriggers 30 stored in cavity 40 in the stacked scooters 10. In each stack, protrusions 28 are nested inside lip 18 of the scooter 10 below to act to maintain the stability the stack of scooters.

FIGS. 13 and 14 also demonstrate the advantageous position of perimeter edge 19 outside lip 18 inside. By outside is meant perimeter 19 extends out further from the top surface 42 of scooter 10 than lip 18. Hand holds 18*a* are defined by lip 18 and are also inside perimeter 19. This inside position has the advantage of protecting the hand from being bumped or pinched by other scooters 10 or other low lying objects as perimeter 19 will act as a guard to prevent the low lying objects from reaching to hands holding handholds 18*a*.

Figure 15:
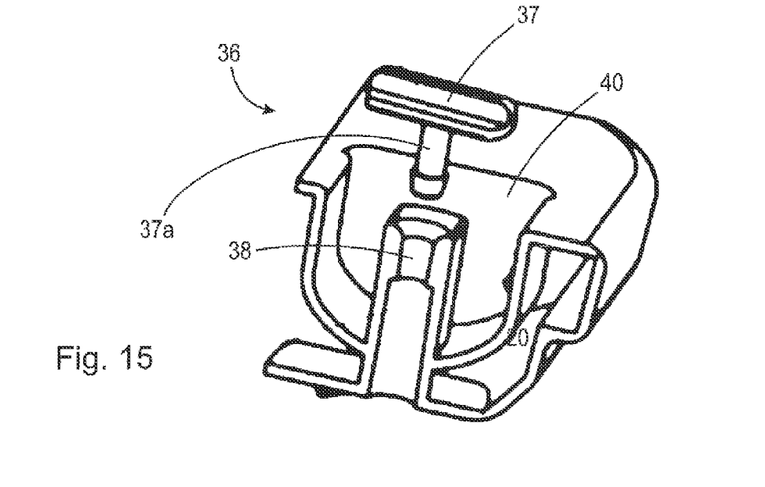
FIGS. 15-17 are various views of one embodiment of the locking means used to hold the outrigger in place.
Figure 16:
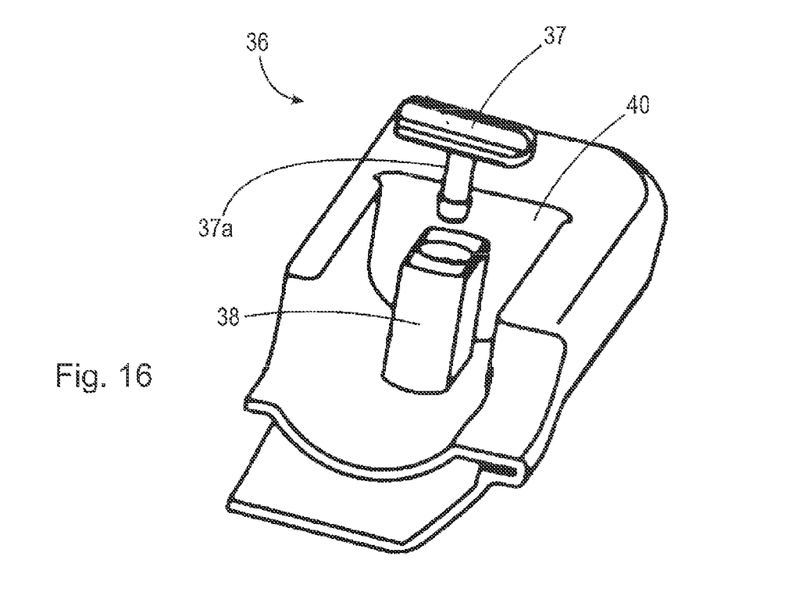
Figure 17:
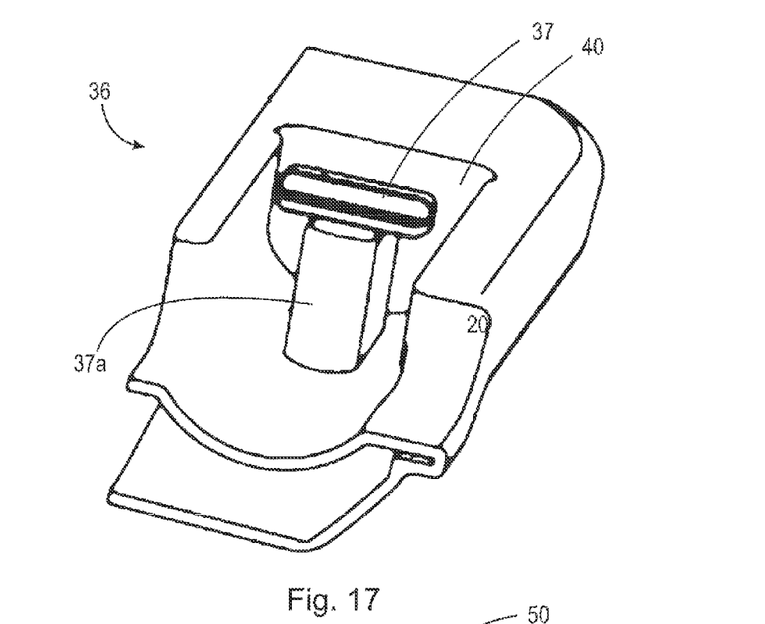

FIGS. 15-17 are various views of one embodiment of locking means 36 used to hold outrigger in place in storage cavity 40 and/or attached to a second scooter 10' in scooter assembly 100. FIG. 15 is a cutaway view of locking means 36 showing lock 37 with stem 37*a* over hollow post 38. FIG. 16 is a front perspective view depicting lock 37 over post 38. FIG. 17 is a front perspective view showing lock 37 inserted into stem 38. Persons of skill in the art will recognize that hole 34 may be sized to fit over hollow post 38 with lock 37 inserted into post 38 and turned to hold outrigger 30 in place. In an alternate embodiment, hole 34 may be sized to form a friction fit around the handle of lock 37 precluding the need to insert stem 37*a* into post 38 each time the particular locking means 36 is used. It will be recognized that other embodiments of locking means 36 may be used such as pins, nut and bolt assemblies to provide a releasable attachment of outrigger 30 to scooter 10.

Figure 18:
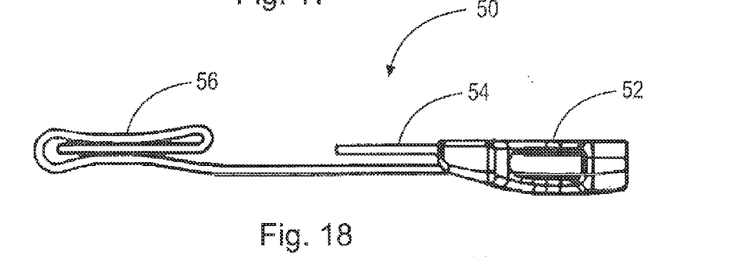
FIG. 18 is a profile view of the safety belt.
Figure 19:
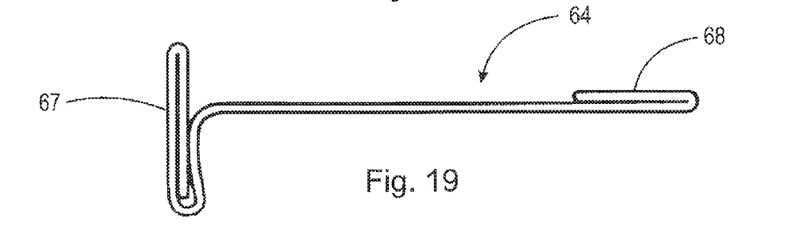
FIG. 19 is a profile view of the shoulder straps.

FIG. 18 is a profile view of safety belt 50. Buckle 52 is shown with first end 54 protruding therefrom to be inserted into second end 56. FIG. 19 depicts shoulder straps 64 straps 66 having loop 67 to fit around backrest 60 and loop 68 into which safety strap 50 is inserted to hold shoulder straps 66 in place.

Thus it is seen that the objects of the invention are efficiently obtained, although changes and modifications to the invention should be readily apparent to those having ordinary skill in the art, which changes would not depart from the spirit and scope of the invention as claimed.

What is claimed is:

1. A scooter comprising:
    a seat having a top surface, a bottom surface, a front side, at least two lateral sides, and a rear side, said at least two lateral sides, said front side, and said rear side forming an outer perimeter of said seat;
    a lip projecting from said top surface and extending around only said at least two lateral sides and said rear side;
    a pair of handholds wherein each one of said pair of handholds is on one of said at least two lateral sides;
    a plurality of rolling means attached to said bottom surface; and,
    an outrigger having a first end and a second end and nestingly stored in a storage cavity of said bottom surface;
    wherein said storage cavity extends inwardly with respect to said bottom surface in a direction away from said plurality of rolling means;
    wherein said lip projection projects generally perpendicularly away from said top surface of said seat; and
    wherein each of said handholds is a space surrounded by said lip.

2. The scooter as recited in claim 1 wherein said outer perimeter extends beyond said lip.

3. The scooter as recited in claim 1 wherein said plurality of rolling means are selected from the group consisting of castors, wheels, and rollers.

4. The scooter as recited in claim 1 further comprising at least one locking means attached to said bottom surface wherein said at least one locking means holds said outrigger to said bottom surface.

5. The scooter as recited in claim 1 wherein said outrigger includes at least one crosspiece.

6. The scooter as recited in claim 1 wherein said outrigger includes two crosspieces.

7. The scooter as recited in claim 1 wherein said first end of said outrigger is shaped into a linking end.

8. The scooter as recited in claim 1 further comprising safety straps attached to said scooter.

9. The scooter as recited in claim 1 further comprising a backrest releasably attached to said scooter.

10. The scooter as recited in claim 1 further comprising at least one additional scooter as claimed in claim 1 wherein each one of said at least one additional scooter is releasably connected to said scooter by said outrigger.

11. The scooter as recited in claim 3 wherein each of said plurality of rolling means is housed in a cover.

12. The scooter as recited in claim 4 further comprising at least one locking means positioned in said storage cavity wherein said at least one locking means hold said outrigger in said storage cavity.

13. The scooter as recited in claim 7 wherein said linking end includes an additional rolling means.

14. The scooter as recited in claim 13 wherein said additional rolling means is a castor swivelingly attached to said linking end.

15. The scooter as recited in claim 8 further comprising slots to receive said safety straps.

16. The scooter as recited in claim 9 further comprising shoulder straps attached to said backrest, wherein said shoulder straps are releasably securable to safety straps.

17. The scooter as recited in claim 10 wherein each one of said at least one additional scooter is releasably connected by a linking end of said outrigger.

18. An assembly of a plurality of scooters, each of said scooters comprising:

a seat having a top surface, a bottom surface, at least two lateral sides, a front side, and a rear side, said at least two lateral sides, said front side, and said rear side forming an outer perimeter of said seat;

a lip projecting from said top surface and extending around only said at least two lateral sides and said rear side;

a pair of handholds wherein each one of said pair of handholds is on one of said at least two lateral sides;

a plurality of rolling means attached to said bottom surface; and, an outrigger having a first end and a second end and nestingly stored in a storage cavity of said bottom surface;

wherein said storage cavity extends inwardly with respect to said bottom surface in a direction away from said rolling means;

wherein each of said plurality of scooters is releasably connected to at least one other scooter of said plurality of scooters by one of said outriggers;

wherein said lip projection projects generally perpendicularly away from said top surface of said seat;

wherein each of said handholds is a space surrounded by said lip; and, wherein said outer perimeter extends beyond said lip.

\* \* \* \* \*